Oct. 10, 1961 J. W. HALL 3,003,311
ADJUSTABLE PROPULSION NOZZLES
Filed July 11, 1958 2 Sheets-Sheet 1
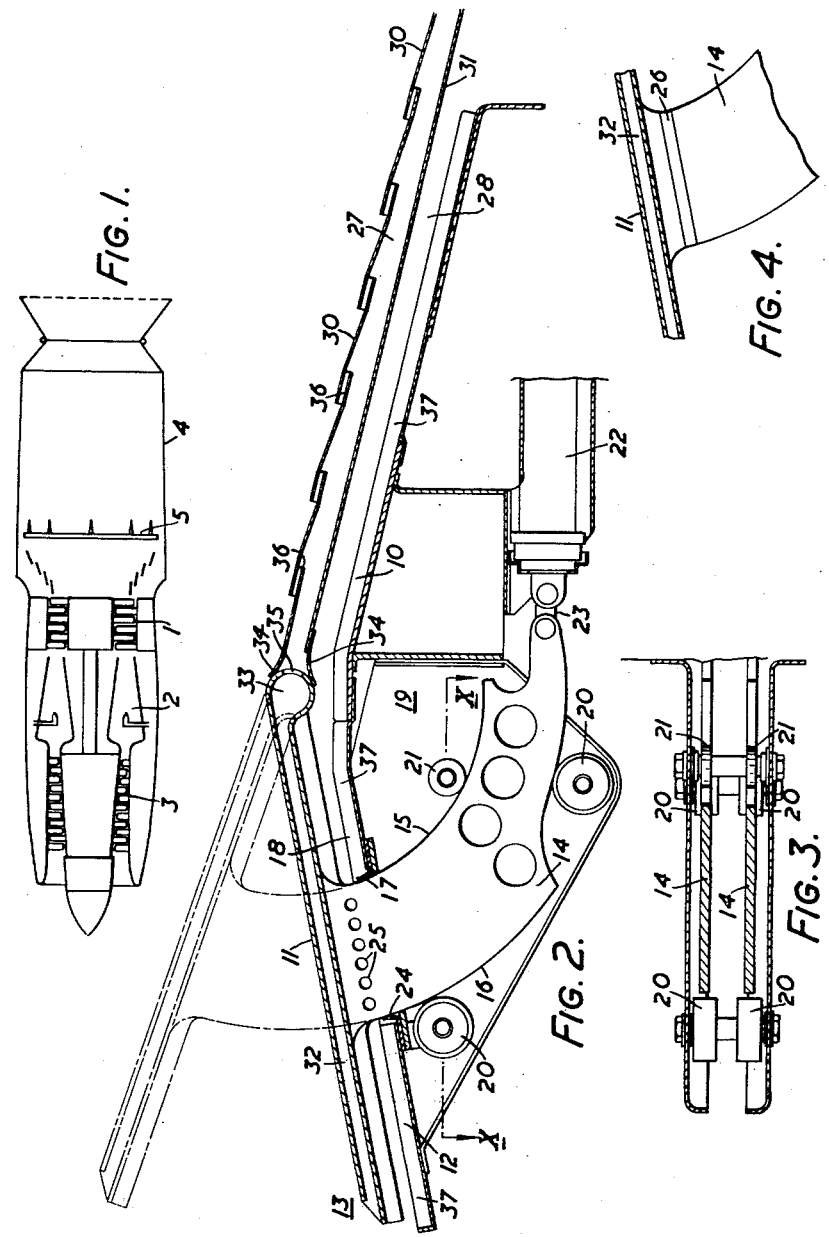
INVENTOR
JOHN W. HALL
BY
ATTORNEYS

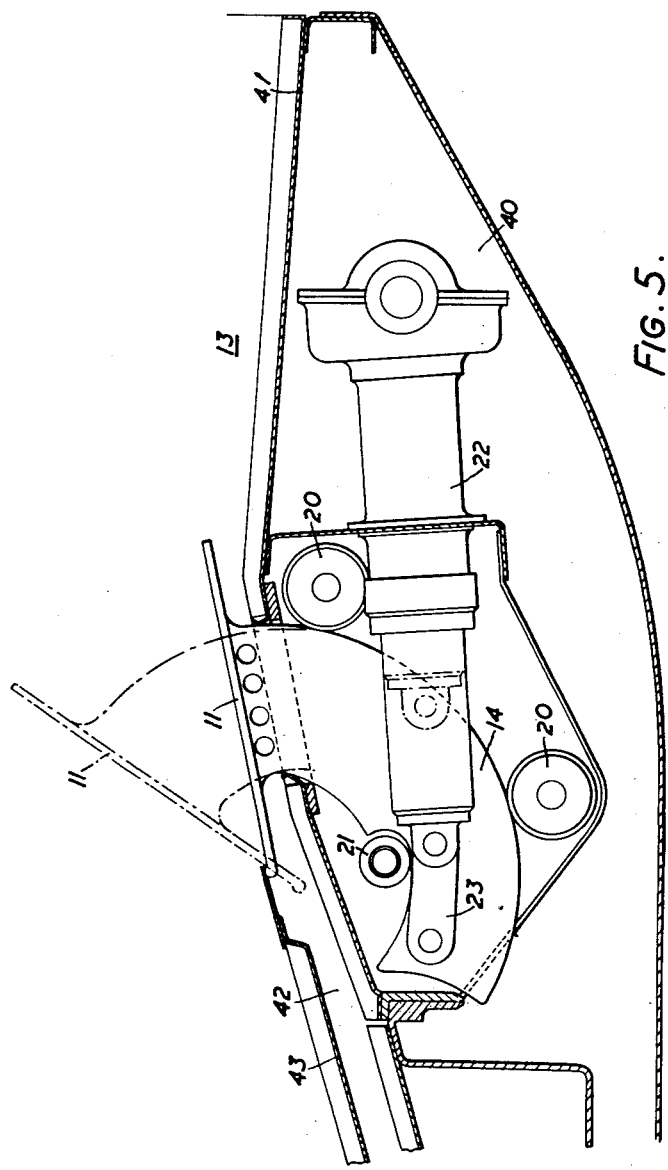

United States Patent Office 3,003,311
Patented Oct. 10, 1961

3,003,311
ADJUSTABLE PROPULSION NOZZLES
John Wallace Hall, Southend-on-Sea, England, assignor to The De Havilland Engine Company Limited, Leavesden, England, a company of Great Britain
Filed July 11, 1958, Ser. No. 748,005
Claims priority, application Great Britain July 17, 1957
4 Claims. (Cl. 60—35.6)

This invention relates to adjustable propulsion nozzles, more especially for use in aircraft, the term aircraft being intended to include both piloted and unpiloted aircraft, and missiles propelled partially or wholly by one or more propulsion jets.

Adjustable propulsion nozzles for use with such aircraft are well known in themselves, the cross sectional area at some point in such nozzles being varied in accordance with flight conditions. Such nozzles usually comprise a series of petals or flaps (referred to herein as petals) hinged adjacent to a fixed nozzle portion so that the cross sectional area of the gas flow path may be varied by causing the petals to rotate about their hinged connections, the angle of the petals in relation to the axis of the nozzle usually being controlled by a linkage or other mechanical means. A disadvantage with such known constructions as that the flaps or petals are hinged in or near to the fixed nozzle portion, which during operation, contains high temperature gases with the result that these hinges themselves are also hot, leading to the possibility or unreliability in service. In some constructions bearings and other operating gear are also situated in or close to this hot nozzle.

It is an object of the present invention to provide an adjustable propulsion nozzle in which the operating mechanism for the flaps or petals is protected to a substantial degree from the heat within the jet nozzle.

According to the present invention a propulsion nozzle construction for jet propulsion apparatus comprises a fixed tubular nozzle portion, and a series of adjustable petals arranged to be moved so as to vary the effective cross sectional area of the nozzle, at least two of the said petals being independently supported and positioned solely by a control element rigidly secured to each petal, and lying on the outerside thereof, each control element being guided by operating apparatus positioned outside the gas stream passing through the nozzle.

Preferably the control element of each of the petals is in the form of a rigid web or bar extending outwardly from the petal in a direction substantially normal to the longitudinal axis of the tubular nozzle, and provided with cam surfaces arranged to cooperate with and be supported by one or more guides fixed relative to the fixed tubular nozzle portion.

The said cam surfaces may conveniently be formed on two opposite edges or faces of each web or bar, or on the inner surfaces of a longitudinal slot provided therein.

A heat barrier is preferably provided in each web or bar adjacent the petal from which it extends and may be in the form of a series of holes extending through the web or bar and extending in line across it.

According to a preferred embodiment the guides are in the form of rollers and preferably each web or bar extends into the tubular nozzle portion through a slot in the wall thereof which is provided with means for maintaining a close sealing fit with the respective web or bar.

The operating apparatus conveniently includes a ram arranged to operate on the control elements of the respective petals, operation of which causes the petals to open or close and so alter the effective cross sectional area of the tubular nozzle portion.

According to a further aspect of the invention each petal includes an internal cooling duct to which cooling gas is preferably arranged to be supplied only when the petal is in its open position.

In order to achieve this the inner end of each petal is formed to substantially close the end of a cooling gas duct provided in the fixed tubular nozzle portion and has an entry port leading into a cooling duct formed in the petal, the entry port being so positioned that it only communicates with the cooling gas duct provided in the fixed tubular nozzle portion when the petal is in its open position.

According to another aspect of the invention the outer faces of the petals are cooled by a subsidiary cooling gas flow which is preferably also caused to flow over the inner wall of a chamber within which the operating apparatus for the petals is situated and through which control elements of the petals extend into the nozzle portion.

The upstream end of each petal may be arranged to rotate about a fixed point in relation to the wall of the tubular nozzle portion when the petals are moved to alter the cross sectional area of the nozzle, or alternatively the upstream end of each petal may be arranged to move on a locus in relation to the wall of the tubular nozzle portion, this movement being utilized to partially close an auxiliary cooling gas duct formed in the outer wall of the tubular nozzle portion when the petal is in the position which causes a minimum cross sectional area within the tubular nozzle portion i.e. when the petals are in their closed position.

In any case the control element is preferably of generally part-annular profile, the radius of curvature of inner and outer surfaces being approximately uniform.

The invention may be performed in various ways but two embodiments will now be described with reference to the accompanying drawings in which:

FIGURE 1 shows a typical engine arrangement to which the invention is applied,

FIGURE 2 is a side elevation of a construction according to the invention,

FIGURE 3 is a cross sectional view on the line X—X of the construction shown in FIGURE 2, FIGURE 4 shows an alternative form of heat barrier between a petal and its operating mechanism and, FIGURE 5 is a side elevation of an alternative construction according to the invention.

As shown in FIGURE 1 the invention is applied to a gas turbine engine having a turbine 1, combustion chambers 2, an air compressor 3 and a fixed tubular tailpipe 4 at the downstream end of which are arranged a series of adjustable petals. A re-heat system is diagrammatically shown at 5 and the petals are moved to their "open" position when the re-heat system is in use and closed when it is shut off.

In the construction shown in FIGURE 2 the propulsion nozzle comprises a fixed tubular nozzle portion 10 of cylindrical or frusto conical form, a series of adjustable petals 11 downstream thereof and a fixed rearwardly extended portion 12 leading to an exhaust orifice 13 from which the hot gases are discharged. The variable plate like petals 11 are arranged about the circumference of the nozzle and to the outer surface of each petal is rigidly connected a pair of webs 14, the inner surface of each of the petals facing into the nozzle. The two webs 14 are of generally part-annular profile and are parallel and concentric with each other, and their inner and outer opposite edges 15, 16 respectively are formed as curved cam surfaces. These webs 14 extend through slots 17 in the outer wall 18 of the tubular nozzle into a chamber 19 surrounding the said outer wall.

A pair of guide rollers 20 on fixed axes are arranged to bear against the outer cam face 16 of each of the webs 14 and a single roller 21 on the inner cam face 15 of each web, all in such manner that the web may be "rolled" between the rollers from, say, a position in which the inner surface of the petal is substantially parallel to the outer wall of the nozzle to a position in which the inner face of each petal forms a substantial angle with such wall. Such movement is imparted to the webs 14 by means of a screw jack 22 connected through a link 23 to the webs 14 associated with each petal. Synchronization of petal movement is achieved by gearing the jacks 22 together and driving them by a single motor ensuring that all the petals move in unison. It will be appreciated that other types of jack or any form of operating mechanism such as electrical or mechanical motors may be used. If jacks of the pneumatic or hydraulic type are used the various petals may be arranged to overlap so that they are constrained to move substantially as a single unit. When the petals are in their closed position i.e. when their inner faces are at an angle to the wall of the nozzle the load on the petals created by the hot working gases in the nozzle is taken through or between the centres of the rollers 20 operating on the outer side 16 of the webs, these rollers 20 similarly taking the load when the jack 22 is operated to roll the web in either direction.

A simple sealing device in the form of a resilient strip 24 secured to the outer wall of the nozzle and bearing against the web is arranged to surround each of the slots 17 to ensure that as little hot gas as possible escapes from the nozzle into the operating apparatus chamber 19. A series of transverse holes 25 are also provided close to the petal at the root of each of the webs 14 to further reduce the conduction of heat from the inner surface of the petals through the webs to the operating apparatus chamber. In an alternative construction as shown in FIGURE 4 the series of holes 25 are replaced by making the webs 14 separate from the petals 11 and providing between them a layer 26 of suitable heat insulating material such as mica or asbestos.

Arranged concentrically with the outer wall of the fixed nozzle portion 10 are two cooling gas ducts 27, 28, the inner wall of the innermost of which is formed by a series of overlapping concentric frusto conical rings 30 and the outer wall 31 of which forms the inner wall of the duct 28. Each petal 11 is formed with one or more internal cooling ducts 32 open to atmosphere at their downstream end and leading into a cylindrical chamber 33 at the upstream end of the petal. The upstream end of the petal is enlarged to accommodate this chamber 33 and effectively closes the downstream end of cooling duct 27 the ends of the walls of which are splayed at 34 to accommodate the cylindrical end of the petal and ensure a substantially gas tight fit. An entry port 35 is provided in the cylindrical wall of the chamber 33 which allows communication between the internal cooling duct 33 in the petal and the duct 27 in the fixed nozzle portion when the petal is in its "open" position. As the petal is rotated into its "closed" position the duct is effectively closed by the relative rotary movement between the splayed portion 34 of the wall 31 and the outer wall of the chamber 33. Combustion gases are bled from the turbine to the duct 27, and when the petals are in their "open" position these gases pass through the entry port 35 and through the internal duct 32 in each petal. These combustion gases are of considerably lower temperature than the gases in the exhaust nozzle when after burning is taking place and they thus help to prevent excessive temperatures damaging the petal. When after burning is not taking place and the petals are in their closed position the port 35 is closed and the combustion gases pass from the duct 27 into the exhaust nozzle through spaces 36 between the overlapping frusto conical rings 30.

Cooling air tapped from the compressor or from a forward facing air intake is passed through the duct 28, into the space between the outer face of the petal and the inner wall of the chamber 19 thus acting to prevent the transfer of heat to the chamber.

The inner surface of the outer wall of the fixed nozzle portion is covered with a layer 37 of heat resisting material such as that sold under the trademark "Refrasil" and it will be seen therefore that the temperature in the nozzle during operation of the engine is effectively insulated from the operating mechanism for the petals by the heat barrier effect of the two cooling ducts and the heat resisting layer of material on the outer wall.

In an alternative construction shown in FIGURE 5 similar reference numerals are used to indicate similar parts of the arrangement but in this case there is no internal cooling for the petals 11 and the screw jacks 22 are arranged downstream of the petals in a chamber 40 which extends around an extended downstream portion 41 of the nozzle.

The forward or upstream end of each of the petals 11 is arranged to travel along a locus defined by the cam surfaces 16, 15, of its associated webs 14 in such a manner that they partly close a subsidiary cooling gas duct 42 formed concentric with the forward part of the nozzle 10 by an inner wall 43 spaced therefrom. The arrangement is such that the forward ends of the petals 11 when in their "open" position i.e. arranged for after burning are approximately in line with the inner wall 43 and cooling gas may flow across their outer faces. When in their "closed" position however, their forward ends are disposed outside the inner wall 43 in such a manner as to restrict the flow of cooling gas through the annular duct 42. Each petal thus rotates and translates bodily during its movement.

The cooling gas may be supplied to the duct in communication with the outer surface of the flaps from any convenient source for example ram air from an auxiliary intake suitably ducted to the required zone or air bled from the engine compressor or delivered from an auxiliary air compressor may be used. This cooling air again in combination with a layer of "Refrasil" on the inner surface of the outer wall of the nozzle helps to insulate the petal operating mechanism from the hot working gases in the nozzle.

It will be appreciated that the invention discloses a method of operating a series of variable petals in a hot gas propulsion nozzle without the use of hinge connections lying in or close to the nozzle and enabling all the operating mechanism to be effectively insulated from the hot gases within the nozzle.

What I claim as my invention and desire to secure by Letters Patent is:

1. A propulsion nozzle construction for jet propulsion apparatus comprising a fixed tubular nozzle portion having a wall and a longitudinal axis, a series of adjustable petals encircling said axis within said fixed nozzle portion, each of said petals being mounted to swing its downstream end between an "open" position in which its downstream end is close to the wall of the fixed tubular nozzle portion, and a "closed" position in which said downstream end is swung away for the wall of the tubular portion so as to vary the effective cross-sectional area of the nozzle and having an outer side which is remote from the said longitudianl axis, and operating means for swinging said petals, said operating means comprising a rigid web rigidly secured to at least each alternate petal and extending through a slot in the wall of the tubular nozzle portion outwardly from said petal and in a substantially radial direction with respect to the longitudinal axis of the tubular nozzle and having a downstream edge and an upstream edge, each said rigid web being provided with a first cam surface on its downstream edge and a second cam surface on its upstream edge, guiding means for each said rigid web positioned outside the gas stream passing through the nozzle and comprising at least one roller arranged to cooperate with one of said cam surfaces and at least two rollers spaced along the length of and cooperating with the other of said cam surfaces, said rollers being fixedly positioned relative to the said fixed tubular nozzle portion.

2. A propulsion nozzle construction as claimed in claim 1 in which each petal includes an internal cooling duct.

3. A propulsion nozzle construciton as claimed in claim 2 including a cooling gas duct in said fixed tubular nozzle portion, the upstream end of each petal being formed to substantially close the end of said cooling gas duct and having an entry port leading into the internal cooling duct in the petal, said entry port being so positioned that it only communicates with the cooling gas duct when the petal is furthest away from said longitudinal axis.

4. A propulsion nozzle construction as claimed in claim 1 in which said operating means includes actuating apparatus actuating the control elements, said actuating apparatus being situated within a chamber having an inner wall constituted by the wall of the tubular nozzle portion and cooled by a subsidiary cooling gas flow.

References Cited in the file of this patent

UNITED STATES PATENTS

| | | |
|---|---|---|
| 211,692 | Bingham | Jan. 28, 1879 |
| 1,001,290 | McKee | Aug. 22, 1911 |
| 2,625,008 | Crook | Jan. 13, 1953 |
| 2,651,172 | Kennedy | Sept. 8, 1953 |
| 2,699,648 | Berkey | Jan. 18, 1955 |
| 2,770,944 | Jordan | Nov. 20, 1956 |
| 2,793,501 | Rike | May 28, 1957 |
| 2,794,317 | Brown | June 4, 1957 |
| 2,801,516 | Battle et al. | Aug. 6, 1957 |
| 2,831,319 | Geary | Apr. 22, 1958 |
| 2,900,789 | Philpot | Aug. 25, 1959 |
| 2,931,169 | Glenn | Apr. 5, 1960 |

FOREIGN PATENTS

| | | |
|---|---|---|
| 768,014 | Great Britain | Feb. 13, 1957 |